Oct. 11, 1966     L. M. HUDSON     3,277,784
WIDE ANGLE PHOTOGRAPHIC OBJECTIVE HAVING A LONG BACK FOCUS
Filed July 1, 1963

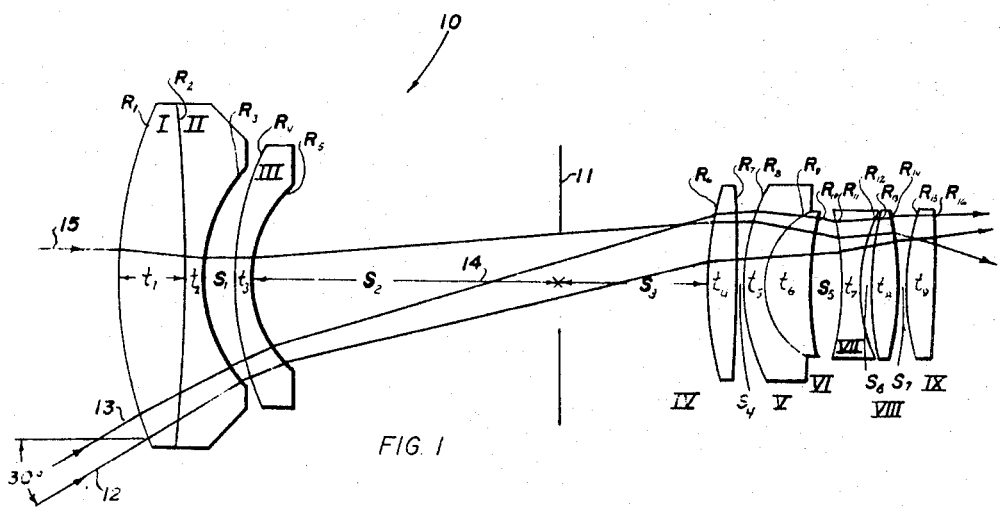

FIG. 1

| E.F.L. = 10.0 mm | B.F.L. = 18.59 mm | f/2.3 | f.a = 60° TOTAL | | |
|---|---|---|---|---|---|
| LENS | RADII | THICKNESSES | SPACES | $n_D$ | $\nu$ |
| I | $R_1 = 39.42$ | $t_1 = 7.06$ | $S_1 = 3.21$ | 1.8037 | 41.8 |
|   | $-R_2 = 158.91$ |   |   |   |   |
| II | $R_3 = 14.52$ | $t_2 = 1.56$ |   | 1.4980 | 67.0 |
| III | $R_4 = 29.46$ | $t_3 = 1.36$ | $S_2 = 31.09$ | 1.7200 | 29.3 |
|   | $R_5 = 12.14$ |   |   |   |   |
| IV | $R_6 = 34.25$ | $t_4 = 2.97$ | $S_3 = 14.97$ | 1.7200 | 50.0 |
|   | $-R_7 = 325.94$ |   |   |   |   |
| V | $R_8 = 19.23$ | $t_5 = 2.30$ | $S_4 = 0.07$ | 1.6510 | 55.8 |
|   | $R_9 = 7.91$ |   |   |   |   |
| VI | $R_{10} = 31.70$ | $t_6 = 4.28$ |   | 1.6910 | 54.8 |
| VII | $-R_{11} = 30.11$ | $t_7 = 1.90$ | $S_5 = 3.30$ | 1.7506 | 27.8 |
|   | $R_{12} = 16.48$ |   |   |   |   |
| VIII | $R_{13} = 26.58$ | $t_8 = 2.77$ | $S_6 = 0.65$ | 1.6570 | 57.2 |
|   | $-R_{14} = 28.28$ |   |   |   |   |
| IX | $R_{15} = 21.92$ | $t_9 = 2.22$ | $S_7 = 0.07$ | 1.6570 | 57.2 |
|   | $-R_{16} = 532.76$ |   |   |   |   |

FIG. 2

INVENTOR.
LENA M. HUDSON
BY Frank C. Parker
ATTORNEY

United States Patent Office 3,277,784
Patented Oct. 11, 1966

3,277,784
WIDE ANGLE PHOTOGRAPHIC OBJECTIVE HAVING A LONG BACK FOCUS
Lena M. Hudson, Brighton, N.Y., assignor to Bausch & Lomb, Incorporated, Rochester, N.Y., a corporation of New York
Filed July 1, 1963, Ser. No. 291,985
1 Claim. (Cl. 88—57)

The present invention relates to a photographic objective and more particularly it relates to a wide angle Gauss type of objective.

Generally, the design of a wide angle objective having such a large field angle as 60° along with an extra long back focus is a formidable problem and such a problem is further complicated when a relative aperture of $f/2.3$ is required. It is necessary in present lens development to achieve additionally a short overall dimension together with an excellent correction of image aberrations. A further problem brought on by the requirement of an unusually large field angle is the positioning of the iris diaphragm in such a manner as to avoid cutting off the light afforded by the outermost pencils of angular field rays.

In view of the above-mentioned design problems, it is an object of the present invention to provide a novel Gauss type photographic objective having a wide field angle of at least 60° and large relative aperture of $f/2.3$ along with an extra long back focus of at least 1.86 times the equivalent focal length of said objective.

A further object of the invention is to provide an objective as above described which has improved brightness of the image in the corner portions of the format contributed by the outermost angular field rays, said rays being allowed to pass through the objective by advantageously locating the iris diaphragm in the large air space between the dispersive and collective groups of lenses.

Further objects and advantages reside in the combination and arrangement of the parts of the objective and in the details thereof as will be apparent by reference to the specification herebelow taken together with the accompanying drawing, in which:

FIG. 1 is an optical diagram of a preferred form of the optical parts of the aforesaid objective; and FIG. 2 is a chart of constructional data therefor.

As shown in FIG. 1, the preferred form of this invention is exemplified in a Gauss type of photographic objective which is generally designated by the numeral 10. Objective 10 is composed of two groups of optically aligned lens members, said groups being a front dispersive group and a rear convergent group separated therefrom by a large air space.

Said front group comprises a front compound negative meniscus lens member which is composed of a front double convex lens element I which lies in contact on its rear side with a double concave lens element II. Said group further comprises a rearwardly spaced singlet negative meniscus lens member III.

In the space between said front and rear lens groups is interposed an iris diaphragm 11 in a manner to be described hereinafter.

Said rear lens group comprises a front double convex singlet lens member IV and spaced rearwardly therefrom is a compound convex-concave lens member which is composed of a front negative meniscus lens element V which is in contact on its rear surface with a positive meniscus lens element VI. Spaced rearwardly from said compound member is a singlet double concave lens member VII which is in edge contact only with a singlet double convex member VIII. Lastly comprised in said rear group is a singlet double convex lens member IX spaced from member VIII.

According to the present invention, the aforesaid extra long back focal length of substantially 1.86F is primarily achieved by providing a focal length ratio of 1.147 between the numerical value of the equivalent focal length of said divergent lens group and the numerical value of the equivalent focal length of said convergent lens group. The equivalent focal length of the divergent lens group is furthermore equal numerically to .2146 times the equivalent focal length of said front compound lens member. Furthermore, said long back focal length is provided while maintaining an excellent correction for spherical and chromatic image aberrations along with a good condition of tangential and sagittal astigmatism, coma, distortion, and curvature of field. The aforesaid improvements are obtained in the presence of a wide angle of at least 60° and a relative aperture of at least $f/2.3$.

In addition to the above-mentioned superior properties of the objective 10 obtained by reason of the advantageous constructional parameters of said objective, the iris diaphragm 11 is located in the large air space between the divergent and covergent lens groups at an axial position where the extreme 30° pencil of rays 12, 13 cross the optic axis 14 and are substantially symmetrically distributed at each side of the axis at this point. Thereby the diaphragm 11 may be operated at a greater range of openings than it would if limited by the marginal ray 15 as it usually is in other objectives when located between the parts of the collective lens group.

All of the above-mentioned advantageous optical properties of said objective 10 are the result of extensive computation and experiment as expressed in the values of the constructional optical parameters specified in the following paragraphs. The curvature specified for the interface of the foremost dispersive lens member has been found very beneficial in correcting distortion.

For the purposes of this invention, it has been determined that the focal lengths of the successive lens parts I to IX should have values as specified in the table of mathematical expressions herebelow wherein F designates the equivalent focal length of the objective, $3.793F < F_\mathrm{I} < 4.193F$
$2.530F < -F_\mathrm{II} < 2.796F$
$2.815F < -F_\mathrm{III} < 3.115F$
$4.104F < F_\mathrm{IV} < 4.534F$
$2.131F < -F_\mathrm{V} < 2.355F$
$1.349F < F_\mathrm{VI} < 1.491F$
$1.326F < -F_\mathrm{VII} < 1.464F$
$2.022F < F_\mathrm{VIII} < 2.234F$
$3.050F < F_\mathrm{IX} < 3.370F$ Additionally, it has been determined that the values for the radii $R_1$ to $R_{16}$ of the successive lens surfaces, numbering from the front, the values for the successive axial lens thicknesses $t_1$ to $t_9$, and the successive air spaces $S_1$ to $S_7$ should be as specified in the table of mathematical expressions herebelow wherein the minus (−) sign used with certain R values means that the center of curvature for each such surface lies on the entrant side of its vertex, F meaning the same as heretofore, $3.742F < R_1 < 4.142F$
$15.097F < -R_2 < 16.685F$
$1.380F < R_3 < 1.524F$
$2.799F < R_4 < 3.093F$
$1.153F < R_5 < 1.275F$
$3.254F < R_6 < 3.596F$
$30.965F < -R_7 < 34.223F$
$1.827F < R_8 < 2.019F$
$.751F < R_9 < .831F$
$3.002F < R_{10} < 3.338F$ $2.861F < -R_{11} < 3.161F$
$1.566F < R_{12} < 1.730F$
$2.525F < R_{13} < 2.791F$
$2.687F < -R_{14} < 2.969F$
$2.087F < R_{15} < 2.297F$
$50.612F < -R_{16} < 55.940F$
$.671F < t_1 < .741F$
$.136F < t_2 < .176F$
$.116F < t_3 < .156F$
$.275F < t_4 < .319F$
$.210F < t_5 < .250F$
$.406F < t_6 < .450F$
$.170F < t_7 < .210F$
$.255F < t_8 < .299F$
$.202F < t_9 < .242F$
$.271F < S_1 < .371F$
$2.954F < S_2 < 3.264F$
$1.422F < S_3 < 1.572F$
$.0010F < S_4 < 0.013F$
$.280F < S_5 < 0.380F$
$.045F < S_6 < 0.085F$
$.0010F < S_7 < 0.013F$ Along with the above-recited values, the absolute values for $n_D$ and $\nu$ representing the refractive index and Abbé number respectively are found to be effective when specified according to the table of mathematical statements herebelow, $1.798 < n_D$ (I) $< 1.808$
$1.493 < n_D$ (II) $< 1.503$
$1.715 < n_D$ (III) $< 1.725$
$1.715 < n_D$ (IV) $< 1.725$
$1.646 < n_D$ (V) $< 1.656$
$1.6860 < n_D$ (VI) $< 1.696$
$1.745 < n_D$ (VII) $< 1.755$
$1.652 < n_D$ (VIII) $< 1.662$
$1.652 < n_D$ (IX) $< 1.662$
$38.0 < \nu$ (I) $< 45.0$
$64.0 < \nu$ (II) $< 70.0$
$26.0 < \nu$ (III) $< 33.0$
$47.0 < \nu$ (IV) $< 53.0$
$52.0 < \nu$ (V) $< 59.0$
$51.0 < \nu$ (VI) $< 58.0$
$24.0 < \nu$ (VII) $< 31.0$
$54.0 < \nu$ (VIII) $< 61.0$
$54.0 < \nu$ (IX) $< 61.0$ More specifically, the above-recited values for focal lengths $F_I$ to $F_{IX}$, lens surface radii $R_1$ to $R_{16}$, lens thicknesses $t_1$ to $t_9$, lens spacings $S_1$ to $S_7$, and refractive index $n_D$ and Abbé number $\nu$ are given for one form of said invention in the table of mathematical statements herebelow, the designations being the same as heretofore, $F_I = 3.993F$
$-F_{II} = 2.663F$
$-F_{III} = 2.965F$
$F_{IV} = 4.319F$
$-F_V = 2.243F$
$F_{VI} = 1.420F$
$-F_{VII} = 1.395F$
$F_{VIII} = 2.128F$
$F_{IX} = 3.210F$
$n_D$ (I) $= 1.8037$
$n_D$ (II) $= 1.498$
$n_D$ (III) $= 1.720$
$n_D$ (IV) $= 1.720$
$n_D$ (V) $= 1.651$
$n_D$ (VI) $= 1.691$
$n_D$ (VII) $= 1.7506$
$n_D$ (VIII) $= 1.657$
$n_D$ (IX) $= 1.657$
$R_1 = 3.942F$
$-R_2 = 15.891F$
$R_3 = 1.452F$
$R_4 = 2.946F$
$R_{13} = 2.658F$
$-R_{14} = 2.828F$
$R_{15} = 2.192F$
$-R_{16} = 53.276F$
$\nu$ (I) $= 41.8$
$\nu$ (II) $= 67.0$
$\nu$ (III) $= 29.3$
$\nu$ (IV) $= 50.0$
$\nu$ (V) $= 55.8$
$\nu$ (VI) $= 54.8$
$\nu$ (VII) $= 27.8$
$\nu$ (VIII) $= 57.2$
$\nu$ (IX) $= 57.2$
$t_1 = .706F$
$t_2 = .156F$
$t_3 = .136F$
$t_4 = .297F$
$t_5 = .230F$
$t_6 = .428F$
$t_7 = .190F$
$t_8 = .277F$
$t_9 = .222F$
$R_5 = 1.214F$
$R_6 = 3.425F$
$-R_7 = 32.594F$
$R_8 = 1.923F$
$R_9 = .791F$
$R_{10} = 3.170F$
$-R_{11} = 3.011F$
$R_{12} = 1.648F$
$S_1 = .321F$
$S_2 = 3.109F$
$S_3 = 1.497F$
$S_4 = .007F$
$S_5 = .330F$
$S_6 = .065F$
$S_7 = .007F$ With respect to one successful form of the present invention, the specific constructional data are given entirely in numerical values in the chart herebelow, the designations $R_1$ to $R_{16}$, $t_1$ to $t_9$, $S_1$ to $S_7$, $n_D$ and $\nu$ having the same meaning as called for in the foregoing description, the designations E.F. and B.F. denotting the equivalent focus and back focus of the objective respectively.

E.F. = 10.0 mm.  B.F. = 18.59 mm.  F.A. = 60°.  f/2.3]

| Lens | Radii | Thicknesses | Spaces | $n_D$ | $\nu$ |
|---|---|---|---|---|---|
| I | $R_1 = 39.42$ | $t_1 = 7.06$ | | 1.8037 | 41.8 |
|   | $-R_2 = 158.91$ | | | | |
| II | $R_3 = 14.52$ | $t_2 = 1.56$ | | 1.498 | 67.0 |
|    |                | | $S_1 = 3.21$ | | |
| III | $R_4 = 29.46$ | $t_3 = 1.36$ | | 1.720 | 29.3 |
|     | $R_5 = 12.14$ | | | | |
|     |               | | $S_2 = 31.09$ | | |
|     |               | | $S_3 = 14.97$ | | |
| IV | $R_6 = 34.25$ | $t_4 = 2.97$ | | 1.720 | 50.0 |
|    | $R_7 = 325.94$ | | | | |
|    |                | | $S_4 = 0.07$ | | |
|    | $R_8 = 19.23$ | | | | |
| V  | $R_9 = 7.91$ | $t_5 = 2.30$ | | 1.651 | 55.8 |
| VI |              | $t_6 = 4.28$ | | 1.691 | 54.8 |
|    | $R_{10} = 31.70$ | | | | |
|    |                  | | $S_5 = 3.30$ | | |
|    | $-R_{11} = 30.11$ | | | | |
| VII | $R_{12} = 16.48$ | $t_7 = 1.90$ | | 1.7506 | 27.8 |
|     |                  | | $S_6 = 0.65$ | | |
|     | $R_{13} = 26.58$ | | | | |
| VIII | $-R_{14} = 28.28$ | $t_8 = 2.77$ | | 1.657 | 57.2 |
|      |                   | | $S_7 = 0.07$ | | |
|      | $R_{15} = 21.92$ | | | | |
| IX   |                  | $t_9 = 2.22$ | | 1.657 | 57.2 |
|      | $-R_{16} = 532.76$ | | | | |

It will be perceived that there is here provided an objective of the wide angle Gauss type having an extra long back focus length at least 1.86 times its equivalent focal length, while achieving a relative aperture of at least $f/2.3$ along with advantageous diaphragm conditions and excellent correction of all chromatic and monochromatic image aberrations, coma, astigmatism, distortion and curvature of field, all of which is in fulfillment of the objects of this invention.

Although only one form of the present invention has been shown and described in detail, other forms are possible and changes may be made in the precise forms of the optical parts and in the values of the optical parameters within the ranges of values specified without departing from the spirit of the invention as set forth in the appended claim.

I claim:

A wide angle photographic objective having a relative aperture of at least $f/2.3$ and an angular field of at least 60° along with an extra long back focus of substantially 1.86F, said objective having a superior correction for spherical and chromatic aberrations as well as tangential and sagittal astigmatism, coma, field curvature, and distortion over the entire field, said object being composed of a divergent front lens group and a convergent rear lens group with a large air space therebetween wherein is located a diaphragm, said front group comprising on the entrant side a divergent compound lens member which is composed of a front double convex lens element I which lies in contact with a rearward double concave lens element II, said front group further comprising a divergent singlet meniscus lens member III,
said rear group comprising a front double convex singlet lens member IV, a compound convergent meniscus lens member spaced rearwardly of member IV and composed of a front divergent meniscus lens element V having a concave rear surface which lies in contact with a collective meniscus lens element VI,
said rear group further comprising a compound divergent lens member spaced rearwardly from element VI and composed of a front double concave lens element VII which lies in edge contact on its rear surface with a singlet double convex lens element VIII,
and spaced rearwardly from element VIII is a rearmost double convex singlet member IX, the negative equivalent focal length of the front lens group being numerically substantially 1.147 times the positive equivalent focal length of said rear lens group, and being substantially numerically .2146 times the equivalent focal lengh of the elements I and II together,
the constructional data for said objective being given in the chart herebelow wherein $R_1$ to $R_{16}$ designate the radii of the successive lens surfaces, numbering from the front of the objective, $t_1$ to $t_9$ designate the successive lens thicknesses of the lens parts I to IX, $S_1$ to $S_7$ designate the successive air spaces, $n_D$ and $\nu$ represent the refractive index and Abbe number respectively of the optical materials from which said parts are made, and E.F. and B.F. designate the equivalent focal length and back focal length respectively of the objective, the minus (—) sign used with certain R values pertaining to lens surfaces which have their centers of curvature located on the entrant side of the vertices of the respective surfaces,

[E.F.=10.0 mm. B.F.=18.59 mm. F.A.=60°. f/2.3]

| Lens | Radii | Thicknesses | Spaces | $n_D$ | $\nu$ |
|---|---|---|---|---|---|
| I | $R_1$ =39.42 | $t_1$=7.06 | | 1.8037 | 41.8 |
| | $-R_2$ =158.91 | | | | |
| II | $R_3$ =14.52 | $t_2$=1.56 | | 1.498 | 67.0 |
| | | | $S_1$=3.21 | | |
| III | $R_4$ =29.46 | $t_3$=1.36 | | 1.720 | 29.3 |
| | $R_5$ =12.14 | | | | |
| | | | $S_2$=31.09 | | |
| | | | $S_3$=14.97 | | |
| IV | $R_6$ =34.25 | $t_4$=2.97 | | 1.720 | 50.0 |
| | $R_7$ =325.94 | | | | |
| | | | $S_4$=0.07 | | |
| V | $R_8$ =19.23 | $t_5$=2.30 | | 1.651 | 55.8 |
| VI | $R_9$ =7.91 | $t_6$=4.28 | | 1.691 | 54.8 |
| | $R_{10}$=31.70 | | | | |
| | | | $S_5$=3.30 | | |
| VII | $-R_{11}$=30.11 | $t_7$=1.90 | | 1.7506 | 27.8 |
| | $R_{12}$=16.48 | | | | |
| | | | $S_6$=0.65 | | |
| VIII | $R_{13}$=26.58 | $t_8$=2.77 | | 1.657 | 57.2 |
| | $-R_{14}$=28.28 | | | | |
| | | | $S_7$=0.07 | | |
| IX | $R_{15}$=21.92 | $t_9$=2.22 | | 1.657 | 57.2 |
| | $-R_{16}$=532.76 | | | | |

References Cited by the Examiner

UNITED STATES PATENTS 2,785,603 3/1957 Cook _____ 88—57
3,064,533 11/1962 Hudson _____ 88—57

JEWELL H. PEDERSEN, *Primary Examiner.*

JOHN K. CORBIN, *Examiner.*